(12) United States Patent
Ganzel

(10) Patent No.: US 8,544,962 B2
(45) Date of Patent: Oct. 1, 2013

(54) HYDRAULIC BRAKE SYSTEM WITH CONTROLLED BOOST

(75) Inventor: Blaise J. Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 406 days.

(21) Appl. No.: 12/740,226

(22) PCT Filed: Oct. 29, 2008

(86) PCT No.: PCT/US2008/081657
§ 371 (c)(1),
(2), (4) Date: Sep. 30, 2010

(87) PCT Pub. No.: WO2009/058916
PCT Pub. Date: May 7, 2009

(65) Prior Publication Data
US 2011/0006594 A1 Jan. 13, 2011

Related U.S. Application Data

(60) Provisional application No. 61/000,761, filed on Oct. 29, 2007, provisional application No. 61/104,928, filed on Oct. 13, 2008.

(51) Int. Cl.
*B60T 13/16* (2006.01)
(52) U.S. Cl.
USPC ......... 303/10; 303/11; 303/114.1; 303/115.4; 303/116.1
(58) Field of Classification Search
USPC .................. 303/10, 11, 113.3, 114.1, 115.1, 303/115.2, 115.4, 116.1, 116.2, 119.1, 119.2; 188/355, 358; 60/325, 535, 545, 581
See application file for complete search history.

(56) References Cited

U.S. PATENT DOCUMENTS

| | | | |
|---|---|---|---|
| 2,541,312 | A | 2/1951 | Vogel |
| 3,729,235 | A | 4/1973 | Bach et al. |
| 3,870,377 | A | 3/1975 | Belart et al. |
| 3,927,915 | A | 12/1975 | Adachi |
| 3,979,153 | A | 9/1976 | Ingram et al. |

(Continued)

FOREIGN PATENT DOCUMENTS

| | | |
|---|---|---|
| CN | 2743190 Y | 11/2005 |
| CN | 1882463 A | 12/2006 |

(Continued)

OTHER PUBLICATIONS

International Search Report for PCT/US2005/016179 dated Aug. 31, 2005.

(Continued)

*Primary Examiner* — Pamela Rodriguez
(74) *Attorney, Agent, or Firm* — MacMillan, Sobanski & Todd, LLC

(57) ABSTRACT

An electronically controlled boosted brake system including an isolation valve between a source of pressurized fluid and a boost valve for selectively restricting the flow of fluid from the source to the boost valve. Another feature of the brake system relates to an accumulator valve connected between the boost valve and the accumulator for controlling when the operating pressure of the accumulator is supplied to the boost valve. Yet another feature is a unique master cylinder design including at least one primary piston positioned within a housing in an overlapping relationship with portions of a pair of secondary pistons.

9 Claims, 8 Drawing Sheets

(56) References Cited

U.S. PATENT DOCUMENTS

| | | | |
|---|---|---|---|
| 4,440,454 | A | 4/1984 | Belart et al. |
| 4,489,989 | A | 12/1984 | Belart et al. |
| 4,604,870 | A | 8/1986 | Bach et al. |
| 4,624,108 | A | 11/1986 | Leiber |
| 4,631,924 | A | 12/1986 | Lowe |
| 4,664,239 | A | 5/1987 | Symes et al. |
| 4,778,224 | A | 10/1988 | Leiber |
| 4,794,757 | A | 1/1989 | Schlüter |
| 4,799,048 | A | 1/1989 | Goshima et al. |
| 4,831,826 | A | 5/1989 | Belart |
| 4,832,416 | A | 5/1989 | Kaes |
| 4,875,338 | A | 10/1989 | Leiber |
| 4,941,322 | A | 7/1990 | Nomura et al. |
| 4,964,676 | A | 10/1990 | Resch |
| 5,273,349 | A | 12/1993 | Kidston |
| 5,448,888 | A | 9/1995 | Castel |
| 5,941,608 | A | 8/1999 | Campau |
| 5,971,027 | A | 10/1999 | Beachley et al. |
| 5,988,768 | A | 11/1999 | Schaefer |
| 6,058,705 | A | 5/2000 | Schunck |
| 6,086,167 | A | 7/2000 | Heckmann |
| 6,113,197 | A | 9/2000 | Kuroki et al. |
| 6,139,119 | A | 10/2000 | Otomo et al. |
| 6,161,904 | A | 12/2000 | Schmidt |
| 6,183,050 | B1 | 2/2001 | Ganzel |
| 6,206,484 | B1 | 3/2001 | Ganzel |
| 6,216,457 | B1 | 4/2001 | Lubbers |
| 6,227,629 | B1 | 5/2001 | Yoshida et al. |
| 6,733,090 | B2 | 5/2004 | Pasterkamp et al. |
| 6,808,238 | B2 | 10/2004 | Drott et al. |
| 7,823,984 | B2 | 11/2010 | Schlüter |
| 2005/0162008 | A1 | 7/2005 | Bickel et al. |
| 2008/0284242 | A1* | 11/2008 | Ganzel ........................ 303/114.1 |
| 2009/0077963 | A1* | 3/2009 | Ganzel ............................ 60/562 |
| 2010/0164276 | A1 | 7/2010 | Schlüter |

FOREIGN PATENT DOCUMENTS

| | | |
|---|---|---|
| DE | 3715209 A1 | 4/1988 |
| DE | 4028925 A1 | 3/1992 |
| DE | 19546647 A1 | 6/1997 |
| DE | 19651153 A1 | 6/1998 |
| DE | 19654427 | 6/1998 |
| DE | 19734956 C1 | 8/1998 |
| DE | 19807369 A1 | 8/1999 |
| DE | 19826346 A1 | 10/1999 |
| DE | 10116203 A1 | 10/2002 |
| DE | 10159788 A1 | 6/2003 |
| DE | 102005037792 B3 | 5/2007 |
| EP | 1210258 A1 | 6/2002 |
| GB | 2141505 A | 12/1984 |
| GB | 2340194 A | 2/2000 |
| JP | 60209357 A | 10/1985 |
| WO | 0172567 A1 | 10/2001 |
| WO | 2005108179 A1 | 11/2005 |
| WO | 2009058916 A1 | 5/2009 |

OTHER PUBLICATIONS

Japanese Office Action for Japanese Patent Application No. 2007-511,705 (English Translation).

Office Action to Chinese Application for Invention No. 200880120022.4 in the name of Kelsey-Hayes Company dated Jul. 3, 2012.

* cited by examiner

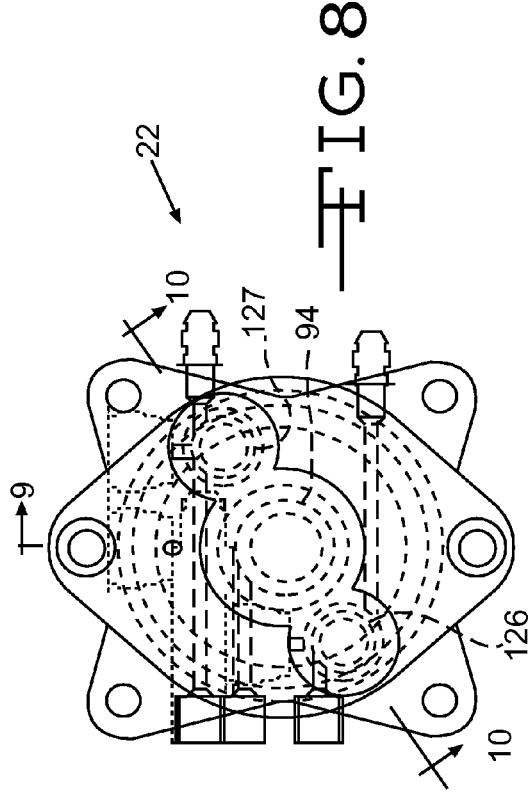
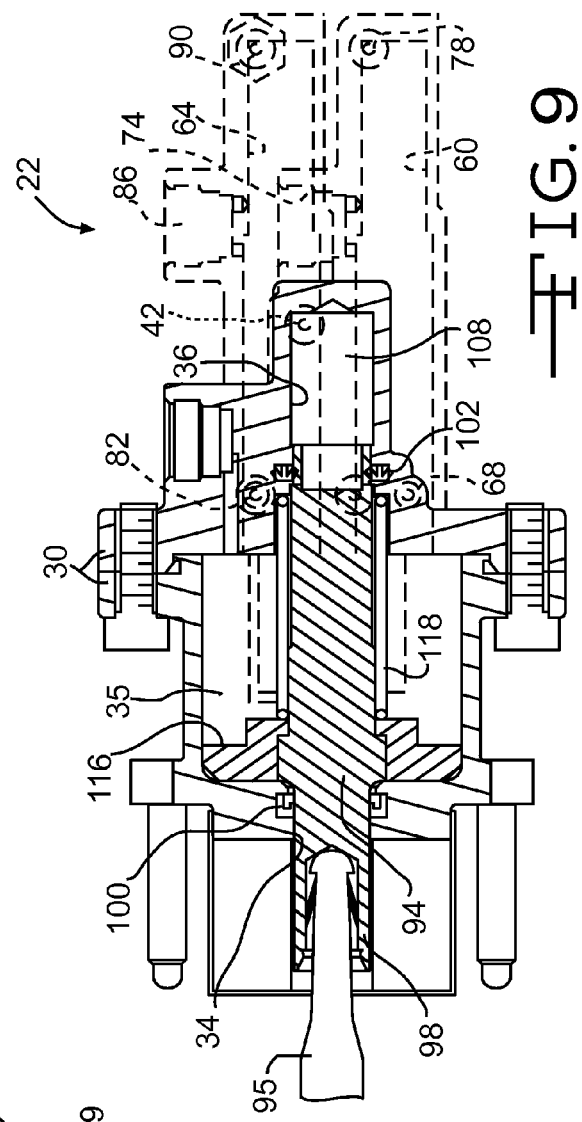

HYDRAULIC BRAKE SYSTEM WITH CONTROLLED BOOST

CROSS-REFERENCE TO RELATED APPLICATIONS

This application claims priority to U.S. Provisional Application No. 61/000,761, filed Oct. 29, 2007, U.S. Provisional Application No. 61/104,928, filed Oct. 13, 2008, the disclosures of which are incorporated herein by reference. This application is related in subject matter to International Application No. PCT/US2005/016179, filed May 6, 2005, and International Application No. PCT/US2006/025510, filed Jun. 29, 2006, both of which are herein incorporated by reference.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

SUMMARY OF THE INVENTION

One aspect of this invention relates to a vehicle braking system for applying pressurized hydraulic brake fluid to a plurality of wheel brakes upon actuation of a brake pedal by a vehicle operator. The braking system includes a source of pressurized brake fluid and a boost valve for controlling a pressure of brake fluid from the source of pressurized fluid to the wheel brakes as a function of the operation of the brake pedal. The braking system includes at least one isolation valve between the source of pressurized brake fluid and the boost valve for selectively restricting the flow of fluid from the source to the boost valve is in an unactuated state.

Another aspect of the invention relates to a vehicle braking system for applying pressurized hydraulic brake fluid to a plurality of wheel brakes upon actuation of a brake pedal by a vehicle operator or upon an automatic braking event. The braking system includes a source of pressurized brake fluid. The source of pressurized brake fluid includes at least one motor driven pump and an accumulator. The accumulator is operable to supply fluid at an operating pressure. A boost valve is connected to receive fluid at an input pressure from both the pump and the accumulator, and is operable for controlling a pressure of brake fluid to the wheel brakes as a function of the operation of the brake pedal or the automatic braking event. The system further includes an accumulator valve connected between the boost valve and the accumulator for controlling when the operating pressure of the accumulator is supplied to the boost valve.

Another aspect of the invention relates to a master cylinder assembly for use in an electrical hydraulic boost braking system for applying pressurized hydraulic brake fluid to a plurality of wheel brakes. The braking system includes a brake pedal, a source of pressurized brake fluid, a boost valve for controlling a pressure of brake fluid from the source of pressurized brake fluid to a boost fluid conduit as a function of the operation of the brake pedal. The master cylinder further includes a housing defining an axis. At least one primary piston is slidably disposed in the housing along a primary path parallel to the axis. The at least one primary piston is displaceable as a function of the operation of the brake pedal. A first secondary piston is slidably disposed in the housing along a first secondary path parallel to the axis, the first secondary piston displaceable by an application of pressurized fluid from the boost fluid conduit and connected to hydraulically actuate at least one wheel brake. a second secondary piston is slidably disposed in the housing along a second secondary path parallel to the axis. The second secondary piston is displaceable by an application of pressurized fluid from the boost fluid conduit and connected to hydraulically actuate at least another one of the wheel brakes. The at least one primary piston is positioned within the housing in an overlapping relationship with portions of the first and second secondary pistons.

Various aspects of this invention will become apparent to those skilled in the art from the following detailed description of the preferred embodiment, when read in light of the accompanying drawings.

BRIEF DESCRIPTION OF THE DRAWINGS

FIG. 8 is an end view of the master cylinder of the brake system of FIG. 1.

FIG. 9 is a side cross-sectional view of the master cylinder taken along lines 9-9 in FIG. 8.

DETAILED DESCRIPTION OF THE PREFERRED EMBODIMENT

Figure 1:
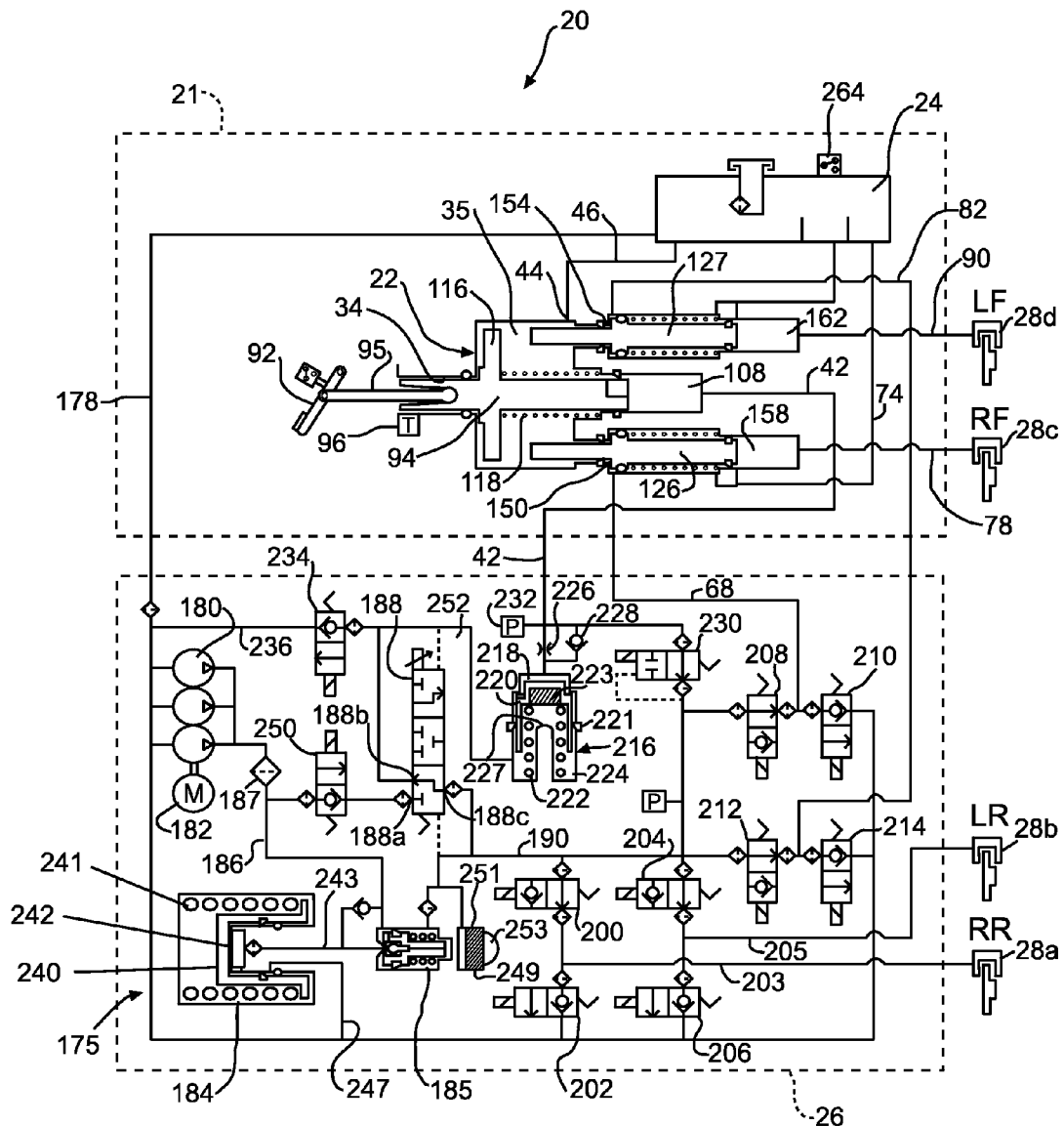
FIG. 1 is a schematic illustration of a first embodiment of a brake system.

Referring now to the drawings, there is illustrated in FIG. 1 a first embodiment of a vehicle brake system indicated generally at 20, in accordance with the invention for applying active hydraulic boost in a braking system. The brake system 20 may suitably be used on a ground vehicle such as an automotive vehicle having four wheels and a wheel brake for each wheel. Furthermore, the brake system 20 can be provided with other braking functions such as anti-lock braking (ABS) and other slip control features to effectively brake the vehicle, as will be discussed below.

The brake system 20 generally includes a master cylinder assembly, indicated generally at 21 in FIG. 1 (also shown enlarged in FIG. 2) and a brake module, indicated generally at 26 in FIG. 1. The components of the brake module 26 may be housed in a single hydraulic control and located remotely from the master cylinder assembly 21. Conduits or hydraulic lines may hydraulically couple the master cylinder assembly 21 and the brake module 26.

The master cylinder assembly 21 cooperatively acts with the brake module 26 for actuating a first wheel brake 28a and a second wheel brake 28b. The first and second wheel brakes 28a and 28b may be, for example, located on a rear vehicle axle. Additionally, the master cylinder 21 cooperatively acts with the brake module 26 for actuating a third wheel brake 28c and a fourth wheel brake 28d. The third and fourth wheel brakes 28c and 28d may be, for example, located on a front vehicle axle. Each of the wheel brakes 28a-d may be a conventional brake operated by the application of pressurized brake fluid. The wheel brake may be, for example, a brake caliper mounted on the vehicle to engage a frictional element (such as a brake disc) that rotates with a vehicle wheel to effect braking of the associated vehicle wheel.

Figure 2:
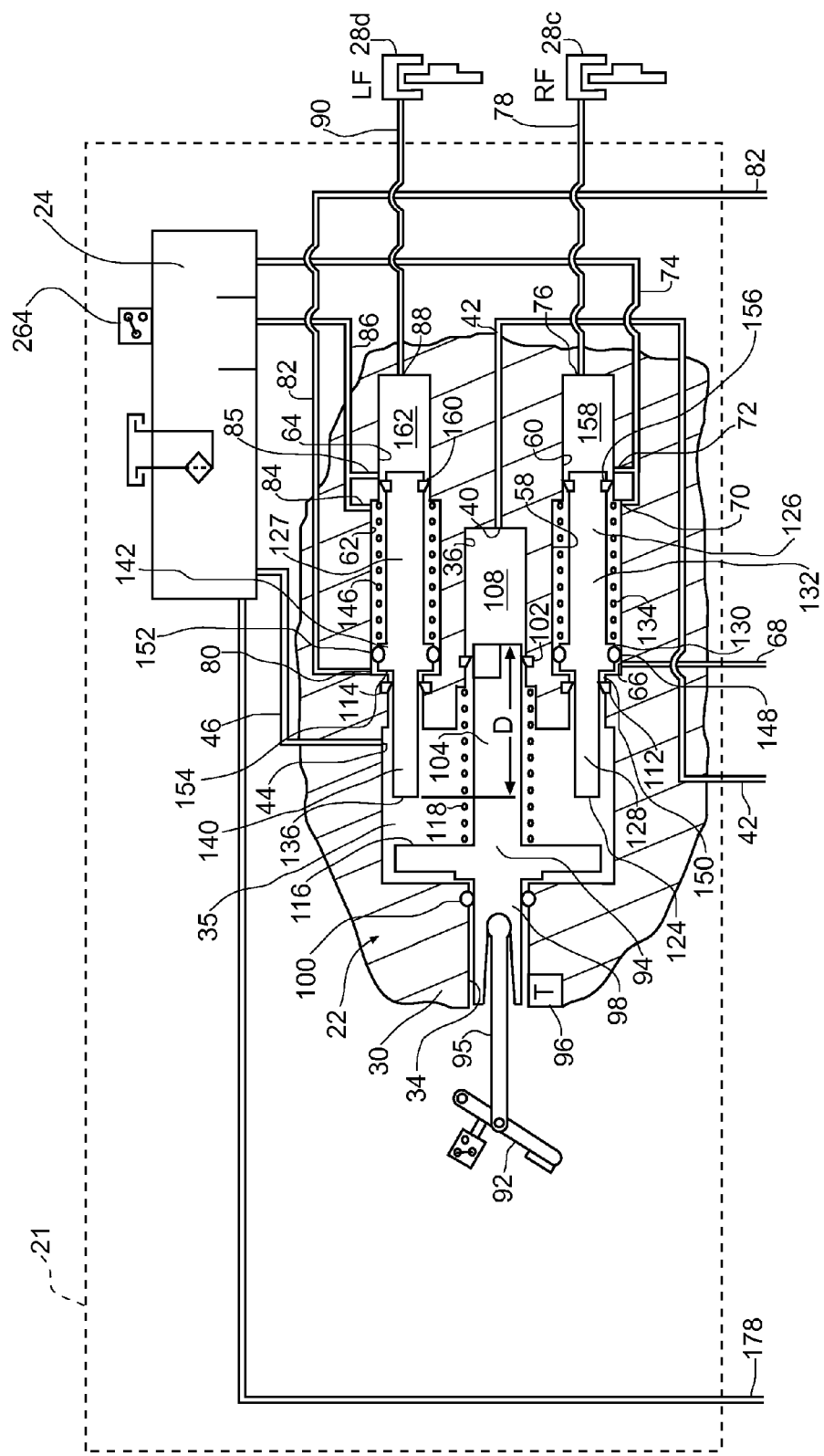
FIG. 2 is an enlarged schematic view of a master cylinder of the brake system of FIG. 1.

As best shown in FIG. 2, the master cylinder assembly 21 includes a master cylinder 22 in fluid communication with a reservoir 24. The reservoir 24 generally holds hydraulic fluid at atmospheric pressure. The master cylinder 22 includes a housing 30 having various bores formed in for slidably receiving various cylindrical pistons therein. The master cylinder housing 30 may be formed as a single unit or two or more separately formed portions coupled together. The master cylinder 22 includes a first bore 34, a cavity 35, and a second bore 36. The first and second bores 34 and 36 are axially aligned with one another. As will be discussed below, a primary piston 94 is slidably disposed in the first and second bores 34 and 36 and includes an intermediate portion disposed in the cavity 35. A first port 40 formed in the second bore 36 is in communication with a fluid conduit 42. A second port 44 formed in the cavity 35 is in communication with a fluid conduit 46 in communication with the reservoir 24.

The housing 30 further includes a third bore 58 and a fourth bore 60 which is narrower than the third bore 58. As will be discussed below, a first secondary piston 126 is disposed in the third and fourth bores 58 and 60. The housing 30 also includes a fifth bore 62 and a sixth bore 64 which is narrower than the fifth bore 62. As will be discussed below, a second secondary piston 127 is disposed in the fifth and sixth bores 62 and 64.

The housing 30 also includes a third port 66 in communication with a fluid conduit 68. A fourth port 70 and a fifth port 72 are both in communication with a fluid conduit 74 which is in communication with the reservoir 24. A sixth port 76 is in communication with a second brake fluid conduit 78 which is in communication with the wheel brake 28c.

The housing 30 further includes a seventh port 80 in communication with a fluid conduit 82. An eighth port 84 and a ninth port 85 are both in communication with a fluid conduit 86 which is in communication with the reservoir 24. A tenth port 88 is in communication with a third brake fluid conduit 90 which is in communication with the wheel brake 28d.

A brake pedal 92 is coupled to a first end of a primary piston 94 of the master cylinder 22 via an input rod 95. The system 20 may further include a travel sensor 96 produces a signal that is indicative of the length of travel of the brake pedal 92. The primary piston 94 includes a first portion 98 slidable within the first bore 34. A seal 100 is located between the inner surface of the first bore 34 and the first portion 98. The primary piston 94 includes a second portion 104 slidable within the second bore 36. A primary seal 102 is located between the inner surface wall of the second bore 36 and the outer wall of the second portion 104. The primary seal 102 provides for a unidirectional seal for preventing the flow of fluid from escaping from a primary chamber 108 into the cavity 35. The primary chamber 108 is defined by the second bore 36, the second portion 104 of the primary piston 94, and the primary seal 102.

The primary piston 94 further includes an abutment portion 116 disposed with the cavity 35. As will be explained below, the abutment portion 116 may at selected times (such as during a failed condition of the brake system 20), abut or engage with a first secondary piston 126 and a second secondary piston 127. The abutment portion 116 can be any suitable feature or component integral with or connected to the primary piston 94 for engaging with the first and second secondary pistons 126 and 127. A primary piston spring 118 is disposed in the cavity 35 and biases the primary piston 94 against the input rod 95 away from the first and second secondary pistons 126 and 127. The spring 118 may be in a preloaded state between the abutment portion 116 of the primary piston 94 and a portion of the housing 30.

The first secondary piston 126 includes a first end 124 of a first portion 128 that steps up to a second cylindrical portion 130. The diameter of the second cylindrical portion 130 is larger than the diameter of the first cylindrical portion 128. The second cylindrical portion 130 steps down to a third cylindrical portion 132 of the first secondary piston 126. The diameter of the third cylindrical portion 132 is smaller than the second cylindrical portion 130. A first secondary piston spring 134 is disposed about the circumference of the third cylindrical portion 132. The ends of the first secondary piston spring 134 are disposed between a stepped surface that transitions between the second cylindrical portion 130 and the third cylindrical portion 132, and a stepped portion that transitions between the fourth bore 58 and the bore 60.

The second secondary piston 127 includes a first end 136 of a first portion 140 that steps up to a second portion 142. A diameter of the second portion 142 is larger than the diameter of the first portion 140. The second portion 142 steps down to a third portion 144 of the second secondary piston 127 that has a diameter smaller than the second portion 142. A second secondary piston spring 146 is disposed about the circumference of the third portion 144. The ends of the first secondary piston spring 146 are disposed between a stepped surface that transitions between the second portion 142 and the third portion 144, and a stepped portion transitioning between the bore 62 and 64. Positioning the secondary piston springs 134 and 146 about the circumference of the first secondary piston 126 and the second secondary piston 127, respectively, helps prevents each of the springs from buckling when compressed. In addition, the overall length of the master cylinder 22 may be reduced as in contrast to packaging the respective secondary piston springs forward of the each respective secondary piston.

A seal 148 is located between the outer surface of the second portion 130 of the first secondary piston 126 and the walls of the bore 58. A seal 112 is located between the first portion 128 of the first secondary piston 126 and a wall of the cavity 35. The seal 148 and the seal 112 seal an intermediate chamber 150 therebetween. Similarly, a seal 152 is located between the outer surface of the second portion 142 of the second secondary piston 127 and the walls of the bore 62. A seal 114 is located between the first portion 140 of the second secondary piston 127 and a wall of the cavity 35. The seal 152 and the seal 114 seal an intermediate chamber 154 therebetween.

A seal 156 is located between an outer surface of the third portion 132 of the first secondary piston 126 and the wall of the bore 60. A first secondary chamber 158 is defined by the seal 156, the end of the first secondary piston 126, and the inner walls of the bore 60. A seal 160 is located between an outer surface of the third portion 144 of the second secondary piston 127 and the wall of the bore 64. A second secondary chamber 162 is defined by the seal 160, the end of the second secondary piston 127, and the inner walls of the bore 64.

The stepped secondary pistons 126 and 127 (more specifically, the third cylindrical portions 132 and 144 of the first secondary piston 126 and the second secondary piston 127, respectively) help compensate for rear bias during normal boost braking operations and lessens dynamic rear proportioning when no electric power is present. The third portions 132 and 144 may have smaller diameters than the respective second portions 136 and 142 of each respective secondary piston. This allows seal 156 and seal 160 disposed about the first and second secondary pistons 126 and 127, respectively, to be smaller. As the brake pedal 92 is released, the respective secondary pistons 126 and 127 are dragged out their respective bores 60 and 64, respectively, since the surface area of each respective piston 126, 127 in contact with the respective seals 156 and 160 have been reduced. As a result, less friction is generated as each secondary piston 126 and 127 slides in and out of their respective cylindrical bores 60 and 64.

In a preferred embodiment, the first secondary piston 126 and the second secondary piston 127 are parallel to one another and overlap one another. In yet another preferred embodiment, at least portions of the primary piston 94, the first secondary piston 126, and the second secondary piston 127 are parallel to one another and overlap one another. As is shown in FIG. 2, the right-hand portion of the primary piston 94 overlaps with the left-hand portions of the first and second secondary pistons by a distance D. The overlap of the respective pistons minimizes the overall length (in a right to left direction as viewing FIG. 1) of the master cylinder 22 which may enhance the feasibility of packaging the master cylinder 22 in a vehicle.

Referring again to FIG. 1, the brake module 26 includes a pressure source, indicated generally at 175. The pressure source 26 provides a source of pressurized hydraulic fluid to the system 10. The pressure source 175 generally includes a pump 180 driven by a motor 182, a medium pressure accumulator (MPA) 184, and a medium pressure accumulator (MPA) pilot valve 185. A reservoir conduit 178 provides hydraulic braking fluid from the reservoir 24 to the pump 180. The pump 180 may be a three-piston style pump driven by an eccentric and oriented 120 degrees from one another. In one embodiment, the motor 182 is a flux switching brushless motor that self monitors its torque output. The MPA 184 is in selective fluid communication with the outlet of the pump 180 via a fluid conduit 186 and the MPA pilot valve 185. The conduit 186 may include a filter 187

The MPA 184 may be a piston style accumulator including a piston 240 biased by a spring 241. A chamber 242 is defined by the piston 240 and wall portions of a housing of the MPA 184. The spring 241 biases piston 240 in a direction to reduce the volume of the chamber 242, thereby pressurizing the chamber 242 and a fluid conduit 243. The conduit 243 is in fluid communication with the conduit 186 via the MPA pilot valve 185. The MPA 184 is an accumulator that is capable of storing pressurized fluid to a predetermined pressure (e.g., 55 bar). Although the MPA 184 is referred to as a "medium" pressure accumulator as opposed to a "high" pressure accumulator used in conventional brake systems, the MPA 184 may be configured to store pressurized fluid at any desired pressure levels. The MPA 184 preferably includes a bypass function that dumps fluid to the reservoir 114 via a conduit 247 and the reservoir conduit 178 when the pressure within the MPA 124 exceeds a predetermined threshold value, such as for example 55 bar. The pressurized fluid in the MPA 124 is utilized to supply pressurized fluid to the boost valve 188 for braking demands that the vehicle encounters during a normal course of driving. This is opposed to emergency braking in which demand for fluid pressure at the boost valve 188 requires a relatively high amount of pressurized brake fluid (pressure exceeding the bypass pressure of the MPA 124) wherein the fluid pump 180 provides for the demanded higher pressure levels.

In operation, pressurized brake fluid from the pump 180 and/or the MPA 184 is supplied to an electro-hydraulic pilot operated boost valve 188. The boost valve 188 may be a variable flow spool valve that at times may maintain pressure in the fluid conduit 186 to allow pressurized brake fluid to flow from the discharge of the pump 180 to the MPA 184 for pressurizing the MPA 184 with pressurized brake fluid. As will be described below, the boost valve 188 further allows the flow of pressurized brake fluid via a boost conduit 190 for actuating the wheel brakes 28a-d. The filter 187 is located within the conduit 186 for filtering pressurized brake fluid provided to the MPA 184 or the boost valve 188 from the pump 180.

The MPA pilot valve 185 is disposed between the pump 180 and the MPA 184. The MPA pilot valve 185 controls the supply of pressurized brake fluid from the pump 180 to the MPA 184. The MPA pilot valve 185 is a pilot operated valve referencing the boost pressure in the circuit 190 and the pressure exiting the pump 180. During normal braking operations in which the fluid pressure from the pump 180 and the MPA 184 are below 30 bar, for example, the MPA pilot valve 185 will be in an open position permitting fluid communication between the pump 180 and the MPA 184. For high demand braking operations in which the pressure required from the boost valve 188 exceeds, for example 55 bar which is above the bypass pressure of the MPA 184, the MPA pilot valve 185 will actuate between open, closed, and metering positions to provide sufficient pressure from the pump 180 in excess of the boost pressure demanded in the circuit 190.

A normally closed (N/C) MPA valve 250 is disposed between a port 188a of the boost valve and a conduit 186 from the pressure source 17. The N/C MPA valve 250 may be a two-position digital isolation valve operable between a fully open position and a fully closed position. The N/C MPA valve 250 may be current limited depending on the pressure and flow rates acting on the valve. This provides the advantage of conserving energy for maintaining the N/C closed valve 250 in an open position when maximum current is not required to do so.

When in a closed position, the N/C MPA valve 250 prevents leakage across the boost valve 188 when the boost valve 188 is in an unactuated state. This allows the boost valve 188 to be manufactured with lower tolerances which reduces the cost of the boost valve 188. Conventionally, spool valves used in boost valves are typically machined to high tolerances to minimize leakage through the boost valve when closed. With the inclusion of the N/C MPA valve 250, the system 20 may include a lower cost boost valve 188. For example, when the boost valve 188 is in an unactuated position, the boost valve 188 isolates the pressurized fluid generated by the pressure source from the boost conduit 190. Leakage of fluid through the spool valve of the boost valve 188 when the boost valve 188 is in a unactuated state results in a loss of pressure in the MPA 184. The pump 180 would thereafter intermittently operate to maintain the pressure in the MPA 184 which ultimately consumes energy as used by the motor. When the N/C MPA valve 250 is in a closed position, the boost valve 188 is isolated from the pressure exerted by the MPA 184 and the pump 180 which could otherwise result in leakage. As a result, the boost valve 188 may be manufactured at lower tolerances which ultimately reduces the cost of the boost valve 188 and greatly minimizes energy consumption since the motor 182 will not have to operate as often to fill the depleting MPA 184.

The system 20 further includes various valves for permitting controlled braking operations, such as ABS, traction control, and vehicle stability control. A first set of valves include an apply valve 200 and a dump valve 202 in fluid communication with the boost conduit 190 for cooperatively supplying brake fluid received from the boost valve 188 to the first wheel brake 28a via a fluid conduit 203, and for cooperatively relieving pressurized brake fluid from the first wheel brake 28a to the reservoir conduit 178. A second set of valves include an apply valve 204 and a dump valve 206 in fluid communication with the boost conduit 190 for cooperatively supplying pressurized brake fluid received from the boost valve 188 to the second wheel brake 28b via a fluid conduit 205, and for cooperatively relieving pressurized brake fluid from the second wheel brake 28b to the reservoir conduit 178.

A third set of valves include an apply valve 208 and a dump valve 210 in fluid communication with the boost conduit 190 and the fluid conduit 68 for cooperatively supplying pressurized brake fluid received from the boost valve 188 for actuating the third wheel brake 28c and for cooperatively relieving pressurized brake fluid from the third wheel brake 28c.

A fourth set of valves include an apply valve 212 and a dump valve 214 that are in fluid communication with the boost conduit 190 and the fluid conduit 68 for cooperatively supplying pressurized brake fluid received from the boost valve 188 for actuating the fourth wheel brake and for cooperatively relieving pressurized brake fluid from the fourth wheel brake 28d.

The valves 200, 204, 208, and 212 may be electrically actuated valves that are ported normally open when in an unactuated position and are ported to a generally unidirectional closed state when energized. The valves 202, 206, 210, and 214 may be electrically actuated valves that are ported to a generally unidirectional normally closed state when in a unactuated position and are ported to a generally position when energized.

The system 20 may also include a compliance accumulator 249 in communication with the boost conduit 190. The compliance accumulator 249 functions as a dampening device to alleviate pressure fluctuations caused by the constant actuation and de-actuation of the apply valves. The compliance accumulator may simply be defined as a housing in communication with the boost conduit 190, wherein the housing includes an elastomeric rubber end plug 251 inserted in the housing. The housing may further define an air pocket 253. In a preferred embodiment, the plug is made of ethylene propylene diene methylene terpolymer (EPDM) rubber. The use of EPDM rubber eliminates the use of pistons and springs, although such an arrangement may be used for the compliance accumulator 249. The EPDM rubber functions as the dampening device to alleviate pressure fluctuations in the boost conduit 190. The compliance accumulator 249 accumulates pressurized brake fluid within the EPDM rubber when the brake fluid pressure within the boost conduit 190 is above a force required to expand the rubber and discharges pressurized brake fluid to the boost conduit 190 when the pressure is less than that required to expand the rubber. The compliance accumulator may regulate incremental pressure changes within the boost conduit 190 without having to constantly change the flow rate and pressure of hydraulic brake fluid via the boost valve 188.

The compliance accumulator 249 may have only a single portal coupled to the boost conduit 190. As a result, the compliance accumulator relies on the resiliency of the EPDM rubber 251 and an air pocket 253 to provide a restorative force against the fluid entering the compliance accumulator. Alternatively, a second conduit line may be coupled to compliance accumulator to maintain a fluid pocket within the housing.

A pedal simulator 216 simulates the characteristics of a conventional boost system as felt by the driver at the brake pedal 92. The pedal simulator 216 includes a first chamber 218 in fluid communication with the primary chamber 108 of the master cylinder 22 via the conduit 42 for receiving brake fluid from the primary chamber 108 during a brake apply operation. A pedal simulator piston 220 and a pedal simulator spring 222 are disposed between the first chamber 218 and a second chamber 224. The second chamber 224 is in fluid communication with the boost valve 188 via a fluid conduit 252.

The brake system 20 may optionally include a dampening orifice 226 and a check valve 228 which cooperate to provide a damped pressure flow in the system 20 creating a "damped feel" as experienced through the brake pedal by the user of the system 20 when pressurized fluid flows into the pedal simulator 216. The dampening orifice 226 is disposed between the primary chamber 108 and the pedal simulator 216. The dampening orifice 226 includes a narrowed cross-sectional passage that restricts the amount of hydraulic brake fluid that can flow through the dampening orifice 226 both to and from the pedal simulator 216. A check valve 228 is coupled in parallel to the dampening orifice 226 between the primary chamber 108 and the pedal simulator 216.

The system 20 further includes a normally open (N/O) base brake valve 230 which may be an electrically actuated valve that is ported normally open when in an unactuated position. The N/O base brake valve 230 is fluidically coupled between the fluid conduit 42 which is in fluid communication with the primary chamber 108 of the master cylinder 22, and the boost conduit 190. A pressure sensor 232 may be coupled to the fluid conduit 42 for monitoring the fluid pressure within the fluid conduit 42. A normally closed (N/C) base brake valve 234 is in fluid communication and disposed between the pedal simulator 216 via the conduit 25 and the reservoir 24 via the conduit 178.

When braking is required, the boost valve 188 is energized to allow pressurized brake fluid provided by the MPA 184 and/or the pump 180 to flow through the boost conduit 190 to actuate the wheel brakes 28a, 28b, 28c, and 28d. In the event of an electrical failure, the boost valve 188 may not remain active and will return to an unactuated position thereby applying no boost function from the MPA 184 and/or pump 180. Since the boost valve 188 is an electrically actuated boost valve, a manual push through operation can be used to provide fluid pressure at the front wheel brakes 28c and 28d and the rear wheel brakes 28a and 28b in the event of an electrical failure. The motive force for manual push through operation for the rear wheel brakes 28a and 28b is manually provided by the operator exerting a force on the brake pedal 92 to pressurize hydraulic fluid in the primary chamber 108 and force hydraulic brake fluid via the fluid conduit 42 through the N/O base brake valve 230. During hydraulic boost operation, the N/O base brake valve 230 is electrically ported closed to allow hydraulic fluid flow to the pedal simulator 216. During an electrical failure, the N/O base brake valve 230 is unactuated to the open position to allow hydraulic brake fluid to flow to the rear wheel brakes 28a and 28b via the conduits 203 and 205. When the N/O base brake valve 230 is in the open position, the hydraulic brake fluid is unrestricted while passing through the base brake valve 230. As a result, no additional pressure is required by the operator of the vehicle to force open the N/O base brake valve 230 (as opposed to a conventional fail-safe valve which could less preferably be utilized in place of the N/O base brake valve 230, and which may require additional force to overcome internal spring forces of such valves to open the ports for allowing hydraulic brake fluid to pass to the vehicle brakes).

When increased hydraulic boost is required for actuating the wheel brakes 28a, 28b, 28c, and 28d (such as during normal brake apply operations), the N/O base brake valve 230 is energized to the closed position. During periods of high boost, when the pressure differential is much greater in the boost conduit 190 in comparison to the conduit 42, the N/O base brake valve 230 is hydraulically locked shut due to the large pressure differential. Under this condition, should the hydraulic boost pressure become too low and manual push through is required, the operator exerts a force on the brake pedal 92 to open both the electrically actuated closed N/O base brake valve 230 and overcome the residual boost pressure still present within the boost conduit 190. To minimize the force required to manual push through the N/O base brake valve 230, the N/O base brake valve 230 is de-energized. Though the N/O base brake valve 230 is de-energized, the N/O base brake valve 230 may remain closed so long as the pressure differential is large enough between the boost conduit 190 and the fluid conduit 42 to maintain the hydraulically locked condition. Should the boost pressure decrease when manual push through is required, the operator needs only to exert a brake pedal force sufficient to overcome the pressure differential (hydraulic lock condition) as opposed to exerting a greater brake pedal force sufficient to overcome the hydraulically locked condition and to open the energized closed N/O base brake valve 230. Furthermore, the N/O base brake valve 230 is disposed between the primary chamber 108 and the pedal simulator 216 upstream of the dampening orifice 226.

When the operator suddenly exerts a large braking force on the brake pedal 92, it is undetermined whether the driver is exerting the large braking force to momentarily brake the vehicle and then quickly release the brakes or if the driver intends to maintain the large braking force to bring the vehicle to a halt. Under both conditions, hydraulic boost from the pump 180 and the MPA 184 quickly builds pressure to actuate wheel brakes 28a, b, c, and d. While the boost valve 188 is energized open to allow the pump 180 and the MPA 184 to increase pressure in the boost conduit 190 for vehicle brake actuation, the flow rate from the primary chamber 108 of the master cylinder 22 via the fluid conduit 42 may be larger than the boost pressure in the boost conduit 190. Under these conditions, the pressure differential between the fluid conduit 42 and the boost conduit 190 may force N/O base brake valve 230 open. To prevent N/O base brake valve 230 from opening under such conditions, N/O base brake valve 230 is fully energized closed to prevent momentary pressure increases within fluid the boost conduit 190 from opening the valve.

To minimize energy consumption of the N/O base brake valve 230, N/O base brake valve 230 is current limited depending upon the hydraulic brake fluid flow rate. That is, when the N/O base brake valve 230 is energized closed, under low flow rates, current supplied to the N/O base brake valve 230 may be decreased proportionally to the flow rate since only a low amount of energy is required to maintain the closed position. Alternatively, if high flow rates are expected within the respective fluid conduits, current supplied to the N/O base brake valve 230 may be increased proportionally since a higher amount of energy is required to overcome the increasing pressure on the N/O base brake valve 230 to maintain the closed position.

A travel sensor 96 is primarily used to determine the driver's braking intent. In some cases, pedal travel may not provide accurate information regarding the drivers braking demands when a large braking force is applied. For example, when an initial force is applied to the brake pedal 92, the brake pedal 92 may travel a substantial distance, however, the increase in the M/C primary pressure may be minimal. Alternatively when a large force is applied to the brake pedal 92 and the force exerted on the brake pedal 92 is slowly decreased, the brake pedal travel may decrease by a small distance but the pedal force may decrease substantially. To better correlate the boost pressure and the pedal travel, the pressure sensor 232 is used to measure the pressure within the fluid conduit 42 to assist in verifying braking demands. For example, when the initial force is applied to the brake pedal 92, the travel sensor 96 is a more accurate indicator for determining the driver's braking demands. When the large force is applied and decreased to the brake pedal 92, pressure measured by the pressure sensor 232 is the more accurate indicator than the travel sensor 96 under this condition since the large decrease in the braking force may be the result of the brake pedal 92 traveling only a small distance. As a result, the pressure measured by the pressure sensor 232 is used in cooperation with the travel sensor 96 for determining driver's braking demands under brake modulation such that boost pressure apply will be limited until a signal for the pressure sensor 232 confirms the travel sensor output. In almost all instances, boost pressure can limited to the wheel lock pressure since there is no added advantage in maintaining boost pressure higher than what is required for a wheel lock condition.

The travel sensor 96 may also be used to determine the flow rate of the supplied hydraulic brake fluid from the master cylinder 22. This flow rate can be used to estimate pressure upstream of the pedal dampening orifice 226 and the N/O base brake valve 230 in conjunction with the signal from the pressure sensor 232. This provides an indication of the expected flow rate for determining the closing force required when energizing the N/O base brake valve 230.

The N/C base brake valve 234 is a normally closed valve that redirects the flow of pressurized fluid from the pedal simulator 216 or from the boost valve 188 via a fluid conduit 236 and the reservoir conduit 178 to the reservoir 24. The reservoir 24 may be vented at atmospheric pressure for storing hydraulic brake fluid. The N/C base brake valve 234 permits the manual push through of hydraulic brake fluid to the rear brakes while preventing lost brake pedal travel to the pedal simulator 216. The N/C base brake valve 234 may be an electrically actuated valve that is ported normally closed when in a de-energized position. Similar to the N/O base brake valve 230, the N/C base brake valve 234 is preferably current limited depending upon the hydraulic brake fluid flow rate for conserving energy. Under high flow rates, the N/C base brake valve 234 will be fully energized using a large current draw to prevent the flow forces of the pressurized hydraulic brake fluid returning from the boost valve 188 or pedal simulator 216 from closing the valve. In low flow conditions, the N/C base brake valve 234 will be energized using smaller current draws to maintain an open valve due to the low forces exerted on the N/C base brake valve 234.

Return hydraulic brake fluid flow from the dump valves 202, 206, 210 and 214 are directed back to the reservoir via the reservoir conduit 178. The return of hydraulic brake fluid from the respective dump valves directly to the reservoir 24 (as opposed to the pedal simulator 216) has the advantage of reducing the pulsation feedback the driver may feel when secondary brake assist functions are used such as ABS. This allows the pressurized hydraulic brake fluid to flow back to reservoir 24 which is primarily unrestricted for the returning brake fluid. Another advantage of returning hydraulic brake fluid via the fluid conduit 178 is that this conduit actually draws the brake fluid from the dump valves 202, 206, 210, 214. Fluid conduit 178 in addition to being a return line to the reservoir 24 provides fluid to the pump 180 when the motor 182 and pump 180 are operating for supplying boost pressure or filling the MPA 184. If hydraulic brake fluid is released from the dump valves 202, 206, 210, 214 while the pump 180 is still operating, the pump 180 draws a vacuum on hydraulic brake fluid entering the pump 180. The vacuum created by the pump 180 draws hydraulic brake fluid from the dump valves 202, 206, 210, 214 at a faster rate than had the pump 180 not been operating.

The pedal simulator 216 as discussed earlier exerts an opposing force on the fluid conduit 42 for providing a restorative force indirectly against the vehicle brake pedal 92 for simulating braking feedback in the brake pedal 92. Pedal simulators in general are sized for respective vehicles based on the requirements of the braking system. However, a modular pedal simulator may be utilized for all vehicle applications.

The following is a description of the operation of the braking system. During a typical braking condition for the braking system 20, a brake pedal 92 is depressed by the operator of the vehicle. The brake pedal 92 is coupled to a travel sensor 96 for producing a signal that is indicative of the length of travel of the brake pedal 92 and providing the signal to a control module (not shown). The control module receives various signals, processes signals, and controls the operation of various components of the brake system 20 in response to the received signals. During normal braking operations the pressure source 189 and the boost valve 188 are operated to provide boost pressure within the conduit 190 for actuation of the wheel brakes 28a-d. As will be explained below, the conduit 190 provides pressurized fluid to the conduits 68 and 82 which are in fluid communication with the master cylinder 22 for moving the secondary pistons 126 and 127 which actuate the wheel brakes 28c and 28d. The conduit 190 also provides pressurized fluid to the conduits 203 and 205 for actuating the wheel brakes 28a and 28b. Under certain driving conditions, the control module communicates with a powertrain control module (not shown) and other additional braking controllers of the vehicle to provide coordinated braking during advanced braking control schemes (e.g., anti-lock braking (AB), traction control (TC), and vehicle stability control (VSC)).

During the vehicle operation, the pressure within the circuit between the MPA 184 and the pump 180 may be monitored (such as by a pressure transducer) and the pressurized brake fluid from the pump 180 is provided to pressurize the fluid in the MPA 184 which generally maintains the MPA 184 at a predetermined pressure threshold (e.g., between 30-55 bars). When the driver's braking demand requires pressurized fluid in excess of what the MPA 184 is capable of applying, the pressurized fluid to the boost valve 188 is generally supplied by the pump 180. The pressurized fluid supplied by the pump 180 is capable of supplying pressurized fluid well above what the MPA 184 is capable of supplying.

During high braking demands, pressurized braking fluid may be supplied by both the MPA 184 and the pump 180. If excessive braking is immediately demanded by the driver of the vehicle, the pump 180 may be initially delayed from providing the pressurized braking fluid to meet the pressure demanded as the motor 122 needs to energize and drive the pump 180 for pressurizing the fluid supplied to the boost valve 188. During this initial braking period, the boost valve 188 generally fully opens (along with the open N/C MPA valve 250) and pressurized hydraulic fluid is provided by both the MPA 184 and the pump 180; however, the pressurized fluid is initially supplied by the MPA 184. As the fluid in the MPA 184 starts to deplete (i.e., the pressure supplied by the MPA 184 decreases) and the pressurized fluid from the pump 180 increases, thereby becoming greater than pressurized fluid provided by the MPA 184 (e.g., at 35 bar), the pressurized brake fluid from the pump 184 may fully supply the boost valve 188. That is, since the pressure in the MPA 184 is lower than that of which the pump 180 is outputting, the fluid in the MPA 184 may be incapable of overcoming the pressure provided by the pump 180 and the pressurized fluid to the boost valve 188 is supplied mainly by the pump 184.

As the pressurized brake fluid is being supplied primarily by the pump 180 to the boost valve 188, the pump 180 output may also be used to fill the MPA 184. Filling the MPA 184 is dependent on the pressure differential between the pressure at the pump 180 and the boost conduit 190. That is, if the flow at the pump 180 is more than what is required in the boost conduit 190, the pressurized fluid from the pump 180, in addition to the pressure being supplied to the boost conduit 190, will be supplied to the MPA 184 for filling the MPA 184. During this period, the MPA pilot valve 185 regulates to permit the pump 180 to fill the MPA 184.

As stated above, during normal braking, the boost valve 188 is energized to allow the pressurized brake fluid provided by the MPA 184 and the pump 180 to actuate the wheel brakes 28*a, b, c,* and *d* via the boost conduit 190. Apply valves 200 and 204 are ported in a de-energized position to allow pressurized brake fluid to be directed to the rear wheel brakes 28*a* and 28*b* via the conduits 203 and 205 for brake actuation. Apply valves 208 and 212 are ported in a de-energized position to allow pressurized brake fluid to flow to the conduits 68 and 82, respectively. The pressurized fluid within the conduits 68 and 82 expands the intermediate chambers 150 and 154, respectively, of the master cylinder 22. The pressurized hydraulic brake fluid entering the intermediate chambers 150 and 154 exerts a force on the first secondary piston 126 and the second secondary piston 127, respectively. The exerted force on the first and second secondary piston 126 and 127 pressurizes the brake fluid in the first secondary chamber 158 and the second secondary chamber 162. The pressurized hydraulic brake fluid in the first secondary chamber 158 is in fluid communication with wheel brake 28*c* via the second brake fluid conduit 78 for actuating wheel brake 28*c*. Similarly, the pressurized hydraulic brake fluid in the second secondary chamber 162 is in fluid communication with wheel brake 28*d* via the third conduit 236 for actuating wheel brake 28*d*.

To provide pedal feedback to the driver during boost operation, the primary piston 94 forces hydraulic brake fluid out of the primary chamber 108 via the fluid conduit 42 to the pedal simulator 216 in response to the depressed brake pedal 92.

The optional dampening orifice 226 disposed between the primary chamber 108 and the pedal simulator 216 restricts the amount of hydraulic brake fluid that can flow through the dampening orifice 226. As the hydraulic brake fluid travels through the dampening orifice 226, an operator depressing the brake pedal 92 feels a resistance due to the restricted flow of hydraulic brake fluid within the dampening orifice 226. This restricted flow of hydraulic brake fluid causes a higher pressure in the primary chamber 108 than in the pedal simulator 216. Added resistance is further provided by the pedal simulator 216. As the hydraulic brake fluid is forced into a pedal simulator first chamber 218 from the fluid conduit 42, pressurized hydraulic brake fluid exerts a force on a simulator piston 220, which in turn, exerts a force and compresses a simulator spring 222. The restorative force exerted by the simulator spring 222 in cooperation with the dampening orifice 226 simulates the characteristics of a conventional boost system as felt by the driver at the brake pedal 92.

The pedal simulator 216 may optionally include an elastomeric bumper 223 which engages with a portion 227 of the housing upon and end stroke of the piston 220. The bumper 223 effectively changes the spring rate when the piston 220 engages with the bumper 223 and further moves against the compression of the bumper 223.

As the pressurized hydraulic brake fluid fills and expands the pedal simulator first chamber 218, hydraulic brake fluid stored in a pedal simulator second chamber 224 is forced out through the fluid conduit 252. During normal braking, the N/C base brake valve 234 is actuated to allow pressurized hydraulic brake fluid to flow from the fluid conduit 252 to the fluid conduit 236. Fluid conduit 236 is in communication with the reservoir conduit 178 and the reservoir 24 which may be vented at atmospheric pressure for storing hydraulic brake fluid.

As the driver releases the brake pedal 92, the control module receives a signal from the travel sensor 96 identifying the driver's action to de-actuate the wheel brakes 28*a, b, c,* and *d*. The control module provides a signal to de-energize the boost valve 188. When in the de-energized position, the flow of pressurized hydraulic brake fluid from the pump 180 and MPA 184 is restricted to the wheel brakes 28*a, b, c,* and *d*. Furthermore, while in the de-energized position, the boost valve 188 is ported to relieve the pressurized hydraulic brake fluid in the fluid conduits that are actuating wheel brakes 28*a, b, c,* and *d*. When de-energized, the boost valve 188 ports the boost conduit 190 to the fluid conduit 252 allowing the release of pressurized hydraulic brake fluid within fluid conduits 190.

Pressure is relieved in the intermediate chambers 150 and 154 of the master cylinder 22 in response to the porting of the boost valve 188 to the de-energized position. In response to the release of pressure in the intermediate chambers 150 and 154, the first secondary piston spring 134 and the second secondary piston spring 146 exert forces on the first secondary piston 126 and the second secondary piston 127, respectively. The first and second secondary pistons 126 and 127 are displaced in response to the restorative forces of the respective secondary piston springs 134 and 146, and as a result, hydraulic brake fluid within the intermediate chambers 150 and 154 is forced out of each respective chamber. The hydraulic brake fluid within the intermediate chambers 150 and 154 is directed to the fluid conduit 68 and fluid conduit 82, respectively. The hydraulic brake fluid in fluid conduits 68 and 82 is ported through dump valves 210 and 214, respectively, and thereafter to the fluid conduit 178 which is fluid communication with the reservoir 24.

During the driver's release of the brake pedal 92, the flow of hydraulic brake fluid from fluid conduits 190 and 252 flows into the pedal simulator second chamber 224. In cooperation with the flow of hydraulic fluid into the pedal simulator second chamber 224, the pedal simulator spring 222 exerts an opposing force of pressure against the pedal simulator piston 220, which in turn, acts on the pedal simulator first chamber 218. The hydraulic brake fluid within the pedal simulator first chamber 218 is forced to the primary chamber 108 of the master cylinder 22 via the fluid conduit 42. The primary piston spring 118 in cooperation with the return of brake fluid in the primary chamber 108 cooperatively returns the primary piston 94 to a no brake apply position when no force is exerted on the brake pedal 92.

During a brake release operation, high fluid flow rates into the pedal simulator second chamber 224 may be present thereby causing the pedal simulator piston 220 to return to a no-brake apply position thereby emptying the brake fluid within the pedal simulator first chamber 218. Once the pedal simulator first chamber 218 is emptied and the piston has bottomed out against an inner wall of the pedal simulator 216, high brake fluid flow rates still entering the pedal simulator second chamber 224 may flow past the lip seal and into the pedal simulator first chamber 218 and thereby to conduit 42 for returning to the primary chamber 108. The high flow rates of brake fluid past a lip seal 221 may cause the lip seal 221 to flip and deform resulting permanent damage. To deter this condition from occurring, a return check flow path regulates the flow rates exiting the pedal simulator (and past the lip seal) to conduit 42.

With respect to driver isolation, pedal pressure is almost never isolated from the driver when exerting a force or relieving pressure on the brake pedal 92 during normal boost braking operation. The pedal simulator spring 222 in cooperation with the dampening orifice 226 maintains a restorative force as hydraulic brake fluid in the primary chamber 108 is pressurized by the brake pedal 92 and enters the pedal simulator first chamber 218. When the brake pedal 92 is released, pressurized hydraulic brake fluid within each of the respective conduits used to actuate the respective vehicle brakes returns to the pedal simulator second chamber 224 and a restorative force (in cooperation with the pedal simulator spring 222) is applied to the brake pedal 92 as it is released. As a result, the pedal pressure from the respective hydraulic brake conduits exerted on the brake pedal 92 is maintained during normal braking conditions. For example, referring to FIG. 1, as the driver releases the brake pedal 92 from a current braking position, the primary piston 94 which is coupled to the brake pedal 92 displaces so as to relieve pressure in the primary chamber 108, which in turn, relieves pressure in the pedal simulator first chamber 218. In response to the release of pressure on the pedal simulator first chamber 218, the pedal simulator spring 222 exerts an opposing force on the simulator piston 220 to force hydraulic brake fluid from the pedal simulator first chamber 218 to primary chamber 108 via the fluid conduit 42. A check valve 228 is coupled in parallel to the dampening orifice 226 to allow the hydraulic brake fluid to flow to the primary chamber 108 at a faster rate than what the dampening orifice 226 would allow. The check valve 228 is ported to only allow hydraulic brake fluid to flow from the pedal simulator 216 to the primary chamber 108.

As discussed earlier, preferably the flux switching brushless motor 182 is used to drive the pump 180. In conventional electrical hydraulic braking systems, typically one or more pressure sensors are included downstream from a pump for determining pressure within a respective fluid conduit. The sensed pressure is monitored by the control module and provides feedback to a motor for controlling operation of the pump to maintain pressure of hydraulic brake fluid within a respective conduit. However, by integrating the flux switching brushless motor 182, the pressure sensors may be eliminated in the brake module 26. The motor 182 self-monitors its output torque based on a correlation of current-to-torque and maintains a respective pressure within the fluid conduit 186 as directed by the control module based on a current-to-pressure correlation. The control module will monitor the travel sensor 96 to determine the braking demand input by the driver in cooperation with other sensors located throughout the vehicle that supply signal inputs to the control module to assist in determining the pump flow required to meet system demand. Other sensor inputs received by the control module include wheel speed of each of the vehicle's wheels, vehicle deceleration, steering angle, vehicle yaw rate, vehicle speed, vehicle roll rate, and signals from radar, infrared, ultrasonic, or similar collision avoidance systems, cruise control systems (including AICC-Autonomous Intelligent Cruise Control Systems), and the like.

In the event of an electrical brake failure, the brake system 20 provides for manual braking. During an electrical failure, the motor 182 might cease to operate, thereby failing to produce pressurized hydraulic brake fluid from the pump 180. Furthermore, the boost valve 188 might return to a de-energized position if energized. To provide manual braking, the driver exerts a high force on the brake pedal 92. The hydraulic brake fluid within the primary chamber 108 is pressurized and directed through the fluid conduit 42. Brake fluid passes through the N/O base brake valve 230 and through the apply valves 200 and 204 for applying braking fluid for actuating the rear wheel brakes 28a and 28b. Manually pressurized brake fluid by the driver via the N/O base brake valve 230 also passes through apply valves 208 and 212 to the intermediate chambers 150 and 154. The pressure exerted in the respective intermediate chambers exerts a force on the first and second secondary pistons 126 and 127 for pressurizing braking fluid with the first and second secondary chambers 150 and 154 for actuating the front wheel brakes 28c and 28d via the conduits 78 and 90.

In the event a hydraulic failure occurs such as a leak within a fluid conduit (e.g., boost conduit 190) making the boost assist operation inoperable, a manual push through operation may be used to brake the front wheel brakes 28c and 28d. Significant leakage of hydraulic brake fluid within a boost assist conduit of the brake module 26 (e.g., boost conduit 190) may lead to inadequate pressurization of the hydraulic brake fluid during normal boost conditions. In such an event, the rear wheel brakes 28a and 28b may be inoperable. To provide a back-up fail-safe condition for stopping the vehicle under such conditions, the driver of the vehicle may manually push through each respective piston of the master cylinder 22 for actuating front wheel brakes 28a and 28b, as will be described below.

Since front wheel brakes 28c and 28d operate on separate conduits 78 and 90, respectively, one of the front vehicle brakes will continue to be operable should the other become inoperable. In conventional braking systems, for a respective force exerted on a brake pedal, the pressure exerted on the vehicle brakes will be proportional to the exerted force on the brake pedal. If a brake conduit becomes inoperable in a conventional system, an incremental amount of force exerted on the brake pedal is required to generate an incremental amount of pressure on the vehicle brakes for compensating for the lost conduit. In the present invention, if a loss of a one of the brake conduit occurs, a same braking force (i.e., used to brake four vehicle brakes) will produce a higher pressure on the operable brakes. For example, if a leak occurs in the boost conduit 190 which results in the loss of the rear brakes 28a and 28b, a same braking force exerted on the brake pedal used to brake wheel brakes 28a-d will produce a higher pressure exerted on wheel brakes 28c and 28d. As a result, the master cylinder 22 compensates for the loss of the brake conduit so that a same braking force exerted on the brake pedal will generate a higher pressure on the operable front brakes. In addition, past braking systems are known to incorporate a bypass valve in parallel with the N/O base brake valve 230 to allow manual braking in the event of non-functional N/O base brake valve 230; however, elimination of such a relief valve allows the driver of the vehicle to generate higher pressures in the master cylinder 22 with respect to 4-wheel push through for a given pedal force. Since the bypass valve is eliminated, higher pressures generated in the master cylinder 22 by the driver are not alleviated. Rather, the driver may generate higher pressures in the master cylinder 22 in the absence of such a relief valve and such pressure is used to apply higher manual braking pressure to the vehicle wheels.

Detecting whether a leak is present in the hydraulic braking system is typically determined by the level of brake fluid in the reservoir 24. A fluid level switch 264 adapted to the reservoir 24 is utilized for determining whether a low level brake fluid condition is present. If the fluid level switch 264 indicates that the brake fluid is low, a warning is provided to the operator of the vehicle indicating that the braking system should be checked for service. However, if an operator senses a normal brake pedal feedback for a respective brake actuation, the operator might ignore the warning indicator not realizing the severity of the present condition.

In conventional braking systems, a direct pressure applied to the brake pedal exerts a force on one or more pistons within the master cylinder which forces hydraulic brake fluid through brake conduits to a plurality of vehicle brakes. A resistive force of the hydraulic brake fluid in the braking conduits provides direct pedal feedback in the conventional braking system. During a condition where a leak is present in a conventional braking system, in addition to the warning light requiring service, an operator may feel a non-typical feedback resistance from the brake pedal (e.g., spongy brakes) thereby raising the operators awareness that the braking system requires servicing. However, in the braking system of the present invention, the pedal simulator may not apply a same resistance feedback from the brake pedal as that of the convention braking system. The restorative force applied against the brake pedal 92 in the present invention is the result of the primary piston 94 within the master cylinder 22 pressurizing hydraulic brake fluid against the simulator piston 220, which in turn, exerts a force and compresses a simulator spring 222. The pressure feedback as applied by the pedal simulator 216 is based on what the expected pressure should be for a respective pedal displacement as sensed by the travel sensor 96 in cooperation with other pressure sensors in comparison to a direct pressure feedback of the conventional braking system. As a result, the pedal simulator 216 may not provide the same resistive braking force feedback as that of a conventional braking system. A driver may acknowledge the warning light but if the resistance force of the brake pedal 92 feels normal to the operator, the operator may assume that immediate servicing is not necessary.

To better assist the operator in determining that a brake failure is occurring which requires immediate attention, a secondary warning (such as service braking system immediately) is preferably provided to the operator. Additional sensors could be added to the braking system to detect the leak, however additional sensors are costly and may not be feasible to implement in the present invention. For example, a pressure differential switch may be disposed between both fluid conduits of the front vehicle brakes. A large pressure differential between the two brake conduits would signify that a leak is occurring in one of the brake conduits. However, since the pressure differential switch would need to be disposed between a respective proportion valve (or isolation valve) and a respective vehicle brake, the pressure differential switch would be subject to rapid pressure differences generated when the braking system is applying anti-lock braking. Such pressure differences could result in false warnings.

To determine whether a hydraulic brake fluid leak is present in the system without adding additional sensors to the system, a determination can be made based on a predetermined amount of flow rate provided to the braking system during a braking condition. In a preferred embodiment, illustrated in FIG. 1, the motor 182 may be a flux switching brushless motor used to drive the pump 180. The motor 182 self-monitors its speed. Based on the operating speed of the motor 180, a determination can be made as to the flow rate of the hydraulic brake fluid as output by the pump 180. A correlation is made based on the flowrate of the hydraulic brake fluid output by the pump 180 as determined by the speed of the motor 182 and the amount of hydraulic brake fluid used by the braking conduit 178 (e.g., amount of brake fluid discharged by the reservoir 24). A ratio greater than a predetermined threshold given the respective braking condition (e.g., high pressure braking or low pressure braking as detected by the travel sensor 96) determines whether a leak is present in the braking system. Alternatively, a conventional motor (e.g., motor with brushes) may be utilized. The flow rate of hydraulic brake fluid as output by the pump 180 is determined by the current draw of the conventional motor 182. In a yet another preferred embodiment (not illustrated), the flow rate of hydraulic fluid flowing to the boost valve 188 may be determined by how often the high pressure accumulator 184 is recharged.

Any significant leakage within a respective fluid conduit of the vehicle braking system 20 may result in a loss of hydraulic brake fluid pressure within the primary chamber 108 of the master cylinder 22 as the primary piston 94 attempts to compress the hydraulic brake fluid. Both the hydraulic boost function and the manual braking function may fail to pressurize the braking system 20 due to the significant leakage. To apply manual push through for braking the front wheel brakes 28c and 28d, the driver exerts a generally longer travel on the brake pedal 92. The longer travel displaces the primary piston 94 beyond the range used during normal boost operation. In this situation, the abutment portion 116 of the primary piston 94 contacts the left-hand end portions of the first and second secondary piston 126 and 127, respectively, as viewing FIG. 1. Thus, as viewing FIG. 1, rightward movement of the primary piston 94 will drive the secondary pistons 126 and 127 in the rightward direction. As the first and second secondary pistons 126 and 127 are displaced, brake fluid within the first and second secondary chambers 158 and 162 is pressurized, thereby exerting a force for actuating the front wheel brakes 28c and 28d. via the conduits 78 and 90, respectively In the event leakage occurs in the one of the secondary chambers, resulting in loss of hydraulic fluid in a respective secondary chamber, one of the front wheel brakes 28c or 28d may be used for braking since both front wheel brakes 28c and 28d are independently actuatable. Manual braking will be available for the rear wheel brakes 28a and 28b and for the respective front wheel brake 28c or 28d that maintains its hydraulic brake fluid conduit integrity.

Various secondary braking strategies may be executed or cooperatively executed by the brake system 20 such as regenerative braking systems, anti-lock braking systems (ABS), traction control, coordinated vehicle stability control, hill hold, automated collision avoidance, or automated cruise control. Thus, it may be desired to actuate one or more of the wheel brakes 28a, b, c, and d for these purposes even when the vehicle driver is not depressing the brake pedal 92. Similarly, it may be desired to temporarily decrease the braking force of one or more of the wheel brakes 28a, b, c, and d, individually or in cooperation, such as for the purposes of antilock braking even if the operator is depressing the brake pedal 92.

Regenerative braking is typically applied to one of the respective axles of a vehicle for energy recapture by simultaneously reducing pressure while exerting an electromagnetic resistive force to the axle. During periods of braking when regenerative braking is applied to a respective axle for maximum recapture of energy, brake blending occurs so that the regenerative braking being applied to the respective axle does not create a torque imbalance between each axle of the vehicle. Too much wheel torque in a respective region of the vehicle leads to a wheel slip condition. As a result, a balance is maintained between recapture energy and balanced braking. Brake balance becomes more complex under conditions when a respective slip control is applied such as anti-lock braking. Under such conditions, each respective vehicle brake of the non-regenerative braking axle is controlled by a respective apply valve and a respective dump valve for supplying, maintaining, or relieving pressure from the respective brake. The respective valves are two-position valves (i.e., fully opened or fully closed). Due to the pulsing of the respective valves during anti-lock braking, different flow rates may be generated within each vehicle brake conduit, and as a result, an unbalanced braking force may be applied to each respective wheel for the respective axle.

Figure 3:
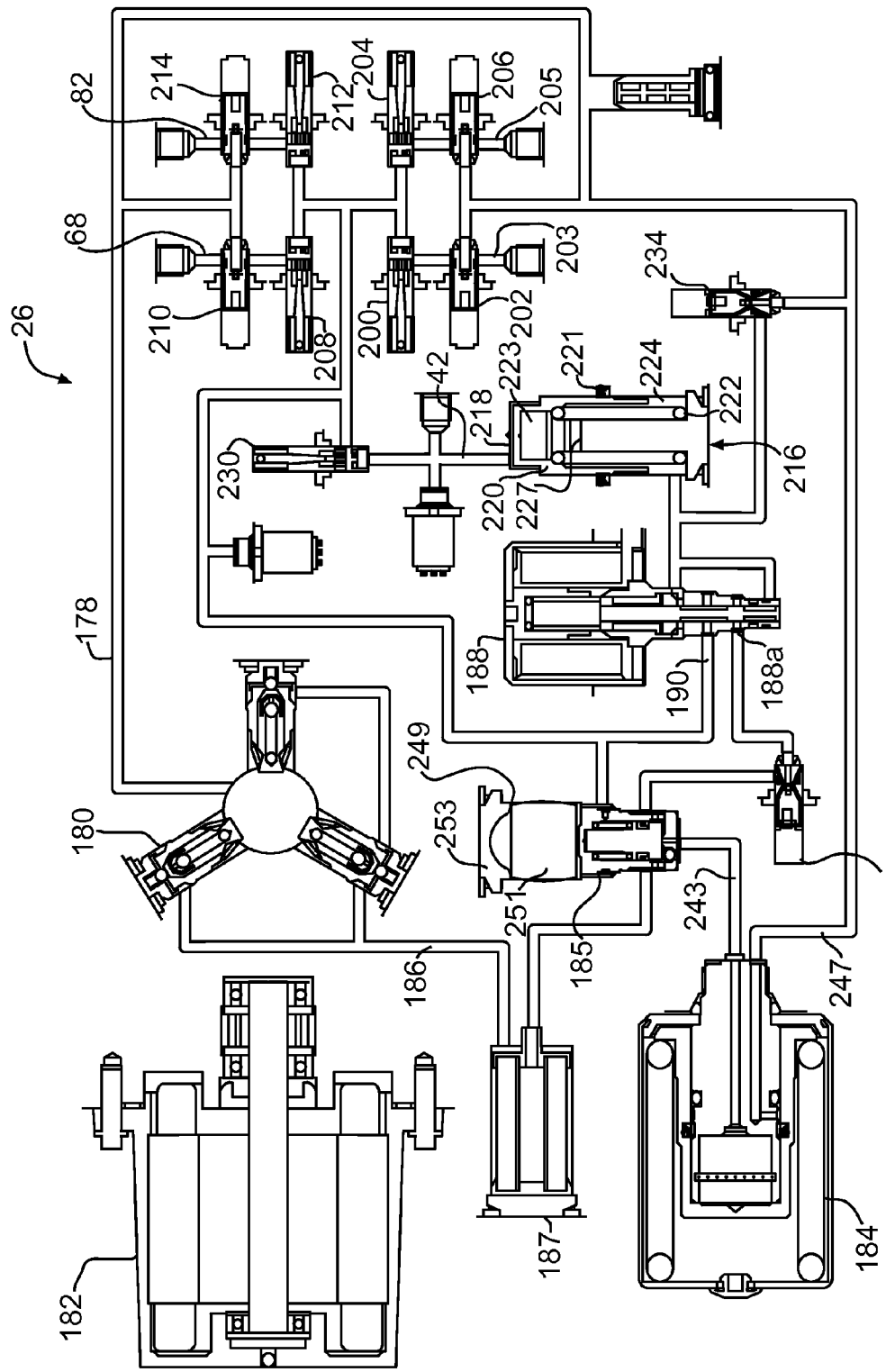
FIG. 3 is a partial schematic illustration of the brake system of FIG. 1, illustrating more detailed structures of the various components of the brake systems.

There is illustrated in FIG. 3, a partial schematic representation of the brake module 26 of FIG. 1. The schematic representation of the brake module 26 in FIG. 3 includes more detailed embodiments or representations of various components of the module 26 as described above with respect to FIG. 1. The components of the module 26 are similar in function as described above with respect to the module 26 in FIG. 1. Therefore, like numbers will be used for similar components as described above with respect to the brake system of FIG. 1.

Figure 4:
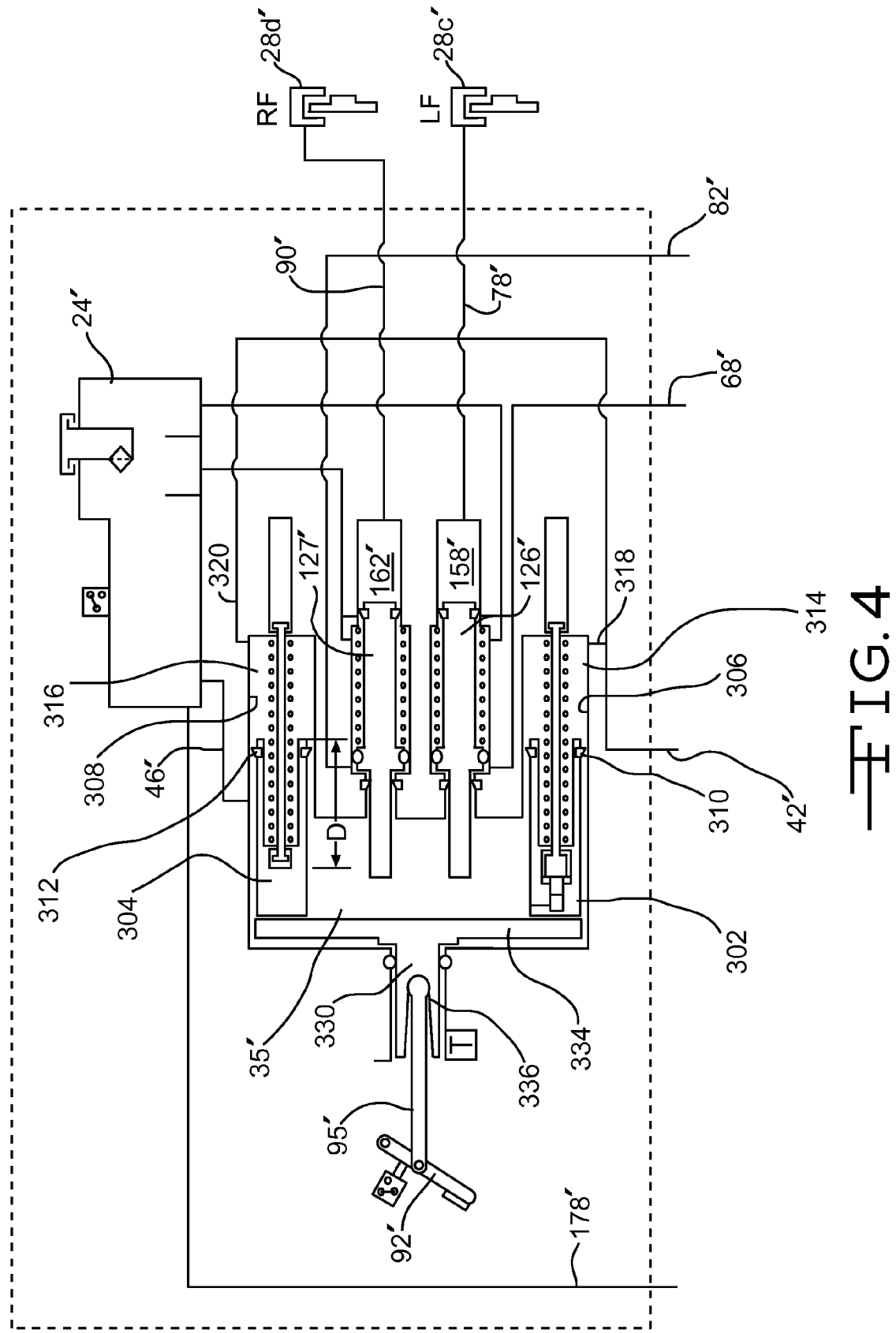
FIG. 4 is a schematic illustration of a second embodiment of a master cylinder which may be used in the brake system of FIG. 1.

There is illustrated in FIG. 4, an alternate embodiment of a master cylinder 300 which may be used in the brake system 20 of FIG. 1 instead of the master cylinder 22. The master cylinder assembly 300 is similar in structure and function as the master cylinder 22 and like numbers with primes will be used for components having similar functions although the structures may be different. One of the main differences is that the master cylinder 300 includes a pair of primary pistons 302 and 304 instead of using a single piston such as the primary piston 94 of the master cylinder 22. The housing of the master cylinder 300 includes bores 306 and 308 slidably receiving the pistons 302 and 304, respectively. Each of the pistons 302 and 306 includes a seal 310 and 312, respectively. The bore 306, the piston 302 and the seal 310 define a first primary chamber 314. The bore 308, the piston 304 and the seal 310 define a second primary chamber 316. The chambers 314 and 316 are in fluid communication with the conduit 42' via conduits 318 and 320. Similar to the master cylinder 22, the conduit 42' is in fluid communication with the pedal simulator 216.

The master cylinder 300 further includes an input piston 330 which is slidably disposed in the bore 34'. The input piston 330 is movable within the cavity 35'. The input piston includes an abutment portion 334 extending outwardly from a main portion 336 slidably disposed in the bore 34'. During most braking applications, the abutment portion 334 abuts or engages with ends of the first and second primary pistons 302 and 304 and pushes the pistons 302 and 304 in a rightward direction as viewing FIG. 4 when the driver depresses the pedal 92'. As the pistons 302 and 304 are moved rightward, the fluid within the chambers 314 and 316 increases in pressure and flows into the conduit 42'. The first and second secondary pistons 126 and 127 operate under the same manner as described above with respect to the master cylinder 22'. Thus, the abutment portion 334 of the input piston 330 will not contact the first and secondary pistons 126 and 127 during normal boosted braking, but may be engaged with and moved by the input piston 330 during failed brake condition. The abutment portion 334 can be any suitable feature or component integral with or connected to the input piston 330 for engaging with pistons 302, 304, 126 and 127.

In a preferred embodiment, each of the respective primary and secondary pistons 302, 304, 126, and 127 are parallel to one another and overlap one another, such as by a distance D as is shown in FIG. 4. The overlap of the respective primary and secondary pistons decreases the overall length (in a right to left direction as viewing FIG. 4) of the master cylinder 300 which may enhance the feasibility of packaging the master cylinder 300 in a vehicle.

Figure 5:
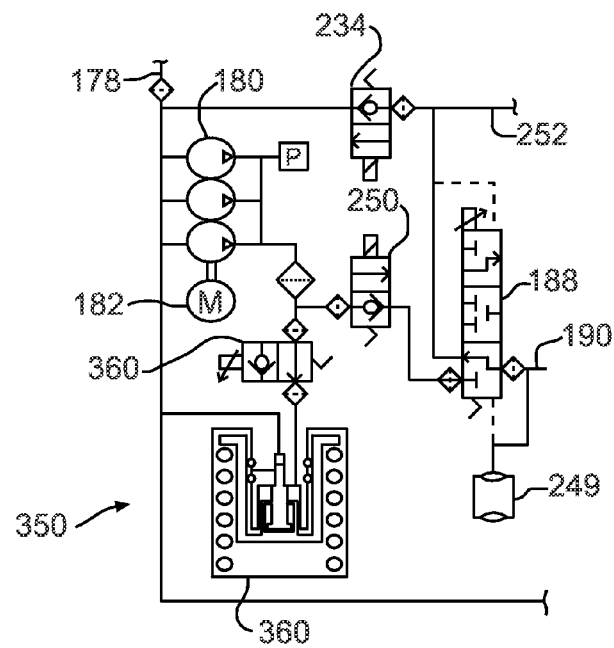
FIG. 5 is a schematic illustration of a second embodiment of a pressure source which may be used in the brake system of FIG. 1.

There is illustrated in FIG. 5, a portion of the brake module 26 illustrating an alternate embodiment of a pressure source 350 which may be used in the brake system 20 of FIG. 1 instead of the pressure source 175. The pressure source 350 has similar components which function in a similar manner and thus, like numbers will be used for similar components and features. For example, the pressure source 350 includes the pump 180, the motor 182, the MPA 184, the N/C base brake valve 234, the N/C MPA valve 250, the boost valve 188, and the compliance accumulator 249 which function in a similar manner as described above with respect to the brake module 26. The MPA 184 of the pressure source 350 in FIG. 5 may function in the same manner as the MPA 184 of the pressure source 175 in FIG. 1.

One of the differences between the pressure sources 175 and 350 is that the pressure source 350 uses a normal open solenoid actuated MPA valve 360 instead of the MPA pilot valve 185 of the brake system 20. The N/O MPA valve 360 controls the supply of pressurized brake fluid from the pump 180 to the MPA 184. The N/O MPA valve 360 may be a two position digital valve or may be a proportional valve. When the N/O MPA valve 360 is in an open position, pressurized fluid flows through the N/O MPA valve 360 for storing pressurized fluid within the MPA 184. When the N/C MPA valve 360 is in a closed position, pressurized fluid from the pump 180 is prevented from flowing through the N/O MPA valve 360 to the MPA 184. During operation of the brake system, pressurized brake fluid is being supplied by the pressure source 350, which can be supplied from the MPA 184 or the pump 180. The pump 20 output may also be used to fill the MPA 184. Filling the MPA 184 is dependent on the pressure differential between the pressure at the pump 180, the boost conduit 190, and the pressure in the MPA 184. That is, if the flow at the pump 180 is more than what is required in the boost conduit 190, the pressurized fluid from the pump 180, in addition to the pressure being supplied to the boost conduit 190, will be supplied to the MPA 184 for filling the MPA 184. During this period, the N/O MPA valve 360 is open to allow the pump 180 to fill the MPA 184. When the MPA 184 is filled, the N/O MPA valve 360 is closed or the N/O MPA valve 360 may be left open if the pump 180 is still operating at a pressure greater than the pressure in the MPA 184.

Figure 6:
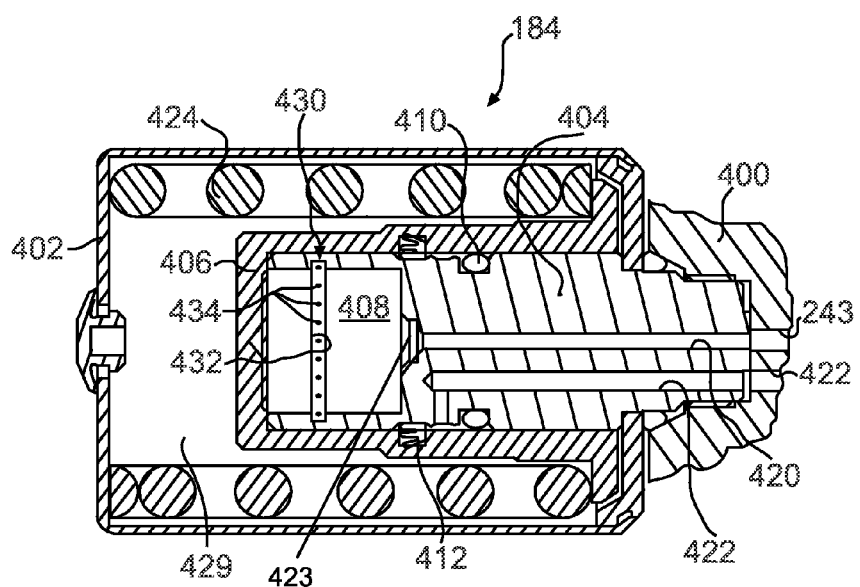
FIG. 6 is a cross-sectional view of the medium pressure accumulator of the brake system of FIG. 1

There is illustrated in FIG. 6 a cross-sectional view of the MPA 184 (medium pressure accumulator) for the brake system 20. The MPA 184 is mounted in a housing 400 of the brake module 26. The MPA includes a housing 402 having a central portion 404. A cup shaped piston 406 is slidably disposed over the central portion 404 to define a pressure chamber 408. An O-ring 410 is mounted on the central portion 404. A lip seal 412 is mounted within a groove formed in an inner wall of the piston 406 to seal off the chamber 408. The central portion 404 includes a bore 420 in fluid communication with the chamber 408 through a filter 423. The bore 420 is also in fluid communication with the conduit 243 of the brake system. The central portion 404 includes a second bore 422 in fluid communication with the conduit 247 and the conduit 178 of the brake system 20. A spring 424 biases the piston 406 against the central portion 404 for decreasing the volume of the chamber 408. The piston 406 which moves leftward as viewed in FIG. 6 when the chamber 408 is filling. Movement of the piston 406 compresses the spring 424 thereby generating a pressure within the chamber 408. A second chamber 429 of the MPA 184 vents to atmosphere.

The MPA 184 preferably maintains an operating pressure between 30-55 bar. Alternatively, the MPA 184 may have a different operating pressure range. The MPA 184 includes an integral bypass function, indicated generally at 430 which vents to the reservoir 24 when a predetermined pressure level (e.g., 55 bar) is reached within the chamber 408 of the MPA 184. The central portion 404 includes an inner groove 432 having a plurality of orifices 434 extending through a tubular wall 436 of the central portion 404. Sufficient movement of the piston 406 in the leftward direction causes the lip seal 412 to move past the orifices 434 such that fluid can flow from the chamber 408 to the reservoir 24 via the bore 422, thereby performing the bypass function and maintaining the chamber 408 at a predetermined pressure level, e.g., 55 bar.

Figure 7:
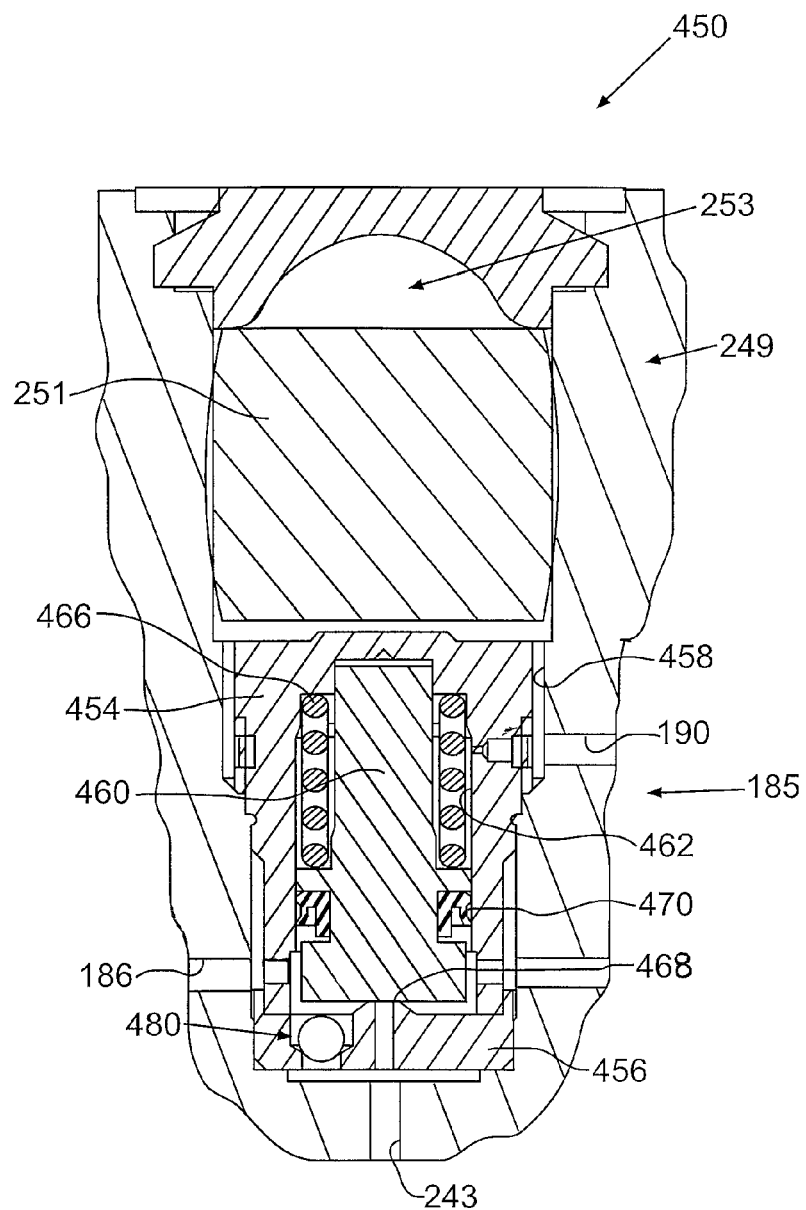
FIG. 7 is a cross-sectional view of a combination compliance accumulator and a medium pressure accumulator pilot valve.

There is illustrated in FIG. 7 a cross-sectional view of a combination assembly 450 of the MPA pilot valve 185 and the compliance accumulator 249 for the brake system 20. The MPA pilot valve 185 and the compliance accumulator 249 are mounted in a housing 452 of the brake module 26. The MPA pilot valve 185 includes a main body 454 and an end cap 456 mounted in a bore 458 formed in the housing 452. A piston 460 is slidably disposed within a bore 462 formed in the main body 454. A spring 466 biases the piston 460 against a valve seat 468 formed in the end cap 456. The valve seat 462 is in communication with the MPA 184 and the pump 180 via the conduit 243. A lip seal 470 is mounted on the piston 460 and engages a side wall of the bore 462 of the main body 454. One side of the piston 460 communicates with the conduit 243 and the conduit 186 from the outlet of the pump 180. The other side of the piston 460 communicates with the boost conduit 190.

During normal boosted braking such as when the pressure at the boost valve (outlet of the pump 180) is below 55 bar, the piston 460 is lifted from the seat 468 by the pressure differential between the boost conduit 190 and the outlet of the pump 180. The piston 460 will generally lift from the seat 468 when the pressure from the pump 180 is greater the boost pressure in the boost conduit 190 by a predetermined value such as 10 bar (corresponding to the load of the spring 466). During this type of braking, the pump 180 may be operated at a relatively low pressure. For braking conditions in which the pressure from the outlet of the pump 180 reaches above a predetermined value (such as the threshold value of the MPA 184 which may be around 55 bar), the piston 460 will seat on the seat 468, thereby closing off fluid communication between the pump 180 and the MPA 184 so that fluid is not dumped to the reservoir 24 via a bypass 430 of the MPA 184. The spring load of the MPA pilot valve 185 generally permits the pressure from the pump 180 to build higher than the pressure of the MPA 184 as required to support the boost function. The MPA pilot valve 185 also allows any excess flow from the pump 180 to fill the MPA 184 (the MPA 124 will bypass flow to the reservoir 24 when full, such as around 55 bar).

A check ball valve 480 is also provided in the MPA pilot valve 185 so that the MPA 184 is able to discharge past the check ball valve 480 such as for example during a spike apply when the driver demands generally high pressure and flow. The check ball valve 480 may also provide for initial bleeding (evacuation and fill) of the MPA 184. The check ball valve 480 may also help to prevent a fluid lock condition with the MPA 184.

The compliance accumulator 249 may be housed within the bore or, alternatively, positioned elsewhere in the brake module 26 in communication with the boost conduit 190. As discussed above, the compliance accumulator 249 includes a plug 251 made of an elastomeric material and cooperates with an air pocket 253 to provide a restorative force against the fluid entering the compliance accumulator.

Figure 10:
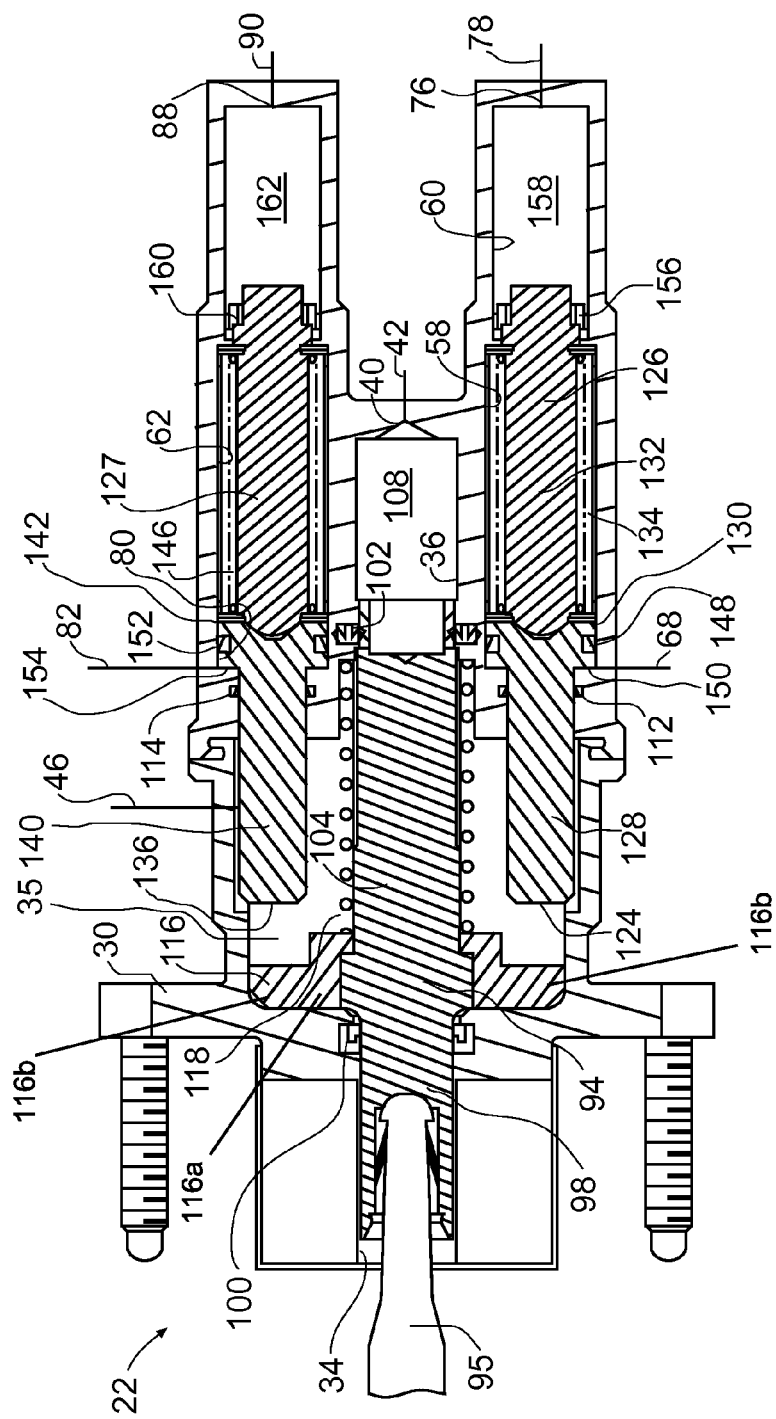
FIG. 10 is a side cross-sectional view of the master cylinder taken along lines 10-10 in FIG. 8.

There is illustrated in FIGS. 8 through 10 the master cylinder 22. The master cylinder 22 has similar components to the master cylinder 22 shown in FIG. 1 and thus, like numbers will be used for similar components and features. The primary piston 94 may be formed from a single component or multiple connecting components. The primary piston 94 is generally centrally disposed within the master cylinder 112. As can be seen in FIGS. 8 through 10, portions of the primary piston 94, the first secondary piston 126, and the second secondary piston 127 are parallel to one another and overlap one another. This arrangement helps to minimize the overall length of the master cylinder 22 (in a right to left direction as viewing FIGS. 9 and 10) which may enhance the feasibility of packaging the master cylinder 22 in a vehicle. As shown, the first and second secondary pistons 126 and 127 are radially aligned with one another with the primary piston 94 disposed between the pistons 126 and 127. To also help minimize the width of the master cylinder 22, the pistons 126 and 127 are mounted relative to one another on a slant relative to the mounting configuration of the master cylinder 22 as best shown in FIG. 8. In other words, when the master cylinder 22 is mounted on the vehicle, the pistons 126 and 127 are not in a straight vertical or horizontal alignment with the primary piston 94.

The abutment portion 116 of the primary piston 94 is in the form of a plate or disk. The abutment portion 116 includes a central portion 116a mounted on the primary piston 94 and a pair of extensions 116b extending outwardly from the central portion 116a. As discussed above, during normal boosted braking (e.g., without any failed conditions) the abutment portion 116 of the primary piston 94 does not contact or engage with the first and second secondary pistons 126 and 127. However, during certain failed conditions, as described above, the extensions 116b of the abutment portion 116 may contact and push the pistons 126 and 127 to provide pressurized fluid to the brakes 28c and 28d even though low or no pressure is provided in the boost conduit 190 such as during a failed condition.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle braking system for applying pressurized hydraulic brake fluid to a plurality of wheel brakes upon actuation of a brake pedal by a vehicle operator, the braking system comprising:
 a source of pressurized brake fluid; and
 a boost valve for controlling a pressure of brake fluid from the source of pressurized fluid to the wheel brakes as a function of the operation of the brake pedal;
 wherein the braking system includes at least one isolation valve between the source of pressurized brake fluid and the boost valve for selectively restricting the flow of fluid from the source to the boost valve in an unactuated state, and wherein the isolation valve is a solenoid actuated digital valve movable between an open position permitting the flow of fluid between the source of pressurized fluid and the boost valve, and a closed position preventing the flow of fluid between the source of pressurized fluid and the boost valve.

2. The system of claim 1, wherein the boost valve is configured as an electronically controlled spool valve, and wherein the isolation valve is operable to reduce leakage of brake fluid through the spool valve when the spool valve is unactuated.

3. The system of claim 1, wherein the source of pressurized brake fluid includes at least one pump and an accumulator.

4. A vehicle braking system for applying pressurized hydraulic brake fluid to a plurality of wheel brakes upon actuation of a brake pedal by a vehicle operator or upon an automatic braking event, the braking system comprising:
 a source of pressurized brake fluid, the source of pressurized brake fluid including at least one motor driven pump and an accumulator, the accumulator operable to supply fluid at an operating pressure; and
 a boost valve connected to receive fluid at an input pressure from both the pump and the accumulator, and operable for controlling a pressure of brake fluid to the wheel brakes as a function of the operation of the brake pedal or the automatic braking event;
 wherein the system further includes an accumulator valve connected between the boost valve and the accumulator for controlling when the operating pressure of the accumulator is supplied to the boost valve, and wherein the accumulator valve selectively restricts the flow of fluid between the accumulator and both the pump and the boost valve when the input pressure required by the boost valve exceeds the operating pressure of the accumulator.

5. The system of claim 4, wherein the accumulator is a medium pressure accumulator providing pressurized braking fluid to the boost valve at pressure levels substantially supporting braking demands below a predetermined pressure, and wherein the pump provides pressurized braking fluid to substantially support braking demands above the predetermined pressure.

6. The system of claim 5, wherein the medium pressure accumulator vents fluid to a fluid reservoir when the pressure within the medium pressure accumulator rises above the predetermined pressure.

7. The system of claim 4, wherein the accumulator valve is a pilot operated valve movable between open, closed, and metering positions.

8. The system of claim 7, wherein the pilot operated valve references the pressure at the source of pressurized fluid and the pressure at an outlet of the boost valve between the boost valve and the wheel brakes.

9. A vehicle braking system for applying pressurized hydraulic brake fluid to a plurality of wheel brakes upon actuation of a brake pedal by a vehicle operator or upon an automatic braking event, the braking system comprising:
 a source of pressurized brake fluid, the source of pressurized brake fluid including at least one motor driven pump and an accumulator, the accumulator operable to supply fluid at an operating pressure; and
 a boost valve connected to receive fluid at an input pressure from both the pump and the accumulator, and operable for controlling a pressure of brake fluid to the wheel brakes as a function of the operation of the brake pedal or the automatic braking event;
 wherein the system further includes an accumulator valve connected between the boost valve and the accumulator for controlling when the operating pressure of the accumulator is supplied to the boost valve, wherein the accumulator valve is a solenoid actuated digital valve movable between an open position permitting the flow of fluid between the pump and the accumulator, and a closed position preventing the flow of fluid between the pump and the accumulator.

* * * * *